(12) United States Patent
Kim et al.

(10) Patent No.: US 11,486,982 B2
(45) Date of Patent: Nov. 1, 2022

(54) OPTICAL PHASE DETECTOR USING ELECTRICAL PULSE THAT CORRESPONDS TO A PHASE ERROR BETWEEN ELECTRICAL PULSES AND OPTICAL PULSES, AND SENSING SYSTEM INCLUDING THE SAME

(71) Applicant: KOREA ADVANCED INSTITUTE OF SCIENCE AND TECHNOLOGY, Daejeon (KR)

(72) Inventors: Jungwon Kim, Daejeon (KR); Yongjin Na, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 511 days.

(21) Appl. No.: 16/784,401

(22) Filed: Feb. 7, 2020

(65) Prior Publication Data

US 2020/0264289 A1   Aug. 20, 2020

(30) Foreign Application Priority Data

Feb. 15, 2019  (KR) .......................... 10-2019-0018203

(51) Int. Cl.
*G01S 7/48* (2006.01)
*G01S 7/4865* (2020.01)
*G01S 7/484* (2006.01)
*G01S 17/88* (2006.01)
*H01S 3/11* (2006.01)

(52) U.S. Cl.
CPC ............ *G01S 7/4865* (2013.01); *G01S 7/484* (2013.01); *G01S 17/88* (2013.01); *H01S 3/11* (2013.01)

(58) Field of Classification Search
CPC .. G01S 17/88; G01S 19/00; G01S 7/48; H01S 3/00; H01S 3/10; H01S 3/11; H01S 3/10053; G01J 1/44; G01J 2009/0203; G01J 2009/0211; G01J 2009/006
USPC .............................................. 250/214 R, 221
See application file for complete search history.

(56) References Cited

U.S. PATENT DOCUMENTS 7,602,322 B2 * 10/2009 Tanimura ............. H04B 10/697
341/120
2008/0024787 A1   1/2008 Kaertner et al.

FOREIGN PATENT DOCUMENTS

| KR | 10-1331980 | 11/2013 |
| KR | 10-1388727 | 4/2014 |
| KR | 10-1687118 | 12/2016 |
| KR | 10-1856882 | 5/2018 |

(Continued)

OTHER PUBLICATIONS

EPO, Extended European Search Report of EP 20157356.5 dated Jul. 22, 2020.

(Continued)

*Primary Examiner* — Que Tan Le
(74) *Attorney, Agent, or Firm* — Lex IP Meister, PLLC

(57) ABSTRACT

A sensing system is provided. The sensing system includes an electrical pulse generator that receives first optical pulses output from a pulsed laser, through a first path, and photo-electrically converts the first optical pulses to generate an electrical pulses; and an optical phase detector that receives second optical pulses output from the pulsed laser, through a second path, and outputs an electrical signal that corresponds to a phase error between the electrical pulses and the second optical pulses based on electro-optic sampling.

13 Claims, 7 Drawing Sheets

(56) References Cited

FOREIGN PATENT DOCUMENTS

KR  10-1866691  6/2018
WO  2014-054963  4/2014

OTHER PUBLICATIONS

K. Jung and J. Kim, "Subfemtosecond synchronization of microwave oscillators with mode-locked Er-fiber lasers," Optics Letters vol. 37, 2958-2960 (2012).
Michael Y. Peng et al., "Balanced optical-microwave phase detector for sub-femtosecond optical-RF synchronization", Optical Express, vol. 22, No. 22, Nov. 3, 2014.

* cited by examiner

OPTICAL PHASE DETECTOR USING ELECTRICAL PULSE THAT CORRESPONDS TO A PHASE ERROR BETWEEN ELECTRICAL PULSES AND OPTICAL PULSES, AND SENSING SYSTEM INCLUDING THE SAME

CROSS-REFERENCE TO RELATED APPLICATION

This application claims priority to and the benefit of Korean Patent Application No. 10-2019-0018203 filed in the Korean Intellectual Property Office on Feb. 15, 2019, the entire contents of which are incorporated herein by reference.

BACKGROUND

(a) Field

The present disclosure relates to an optical phase detection.

(b) Description of the Related Art

Measuring time-of-flight (TOF) of optical pulse train is used to acquire a physical quantity (e.g., a distance) of a measurement target object and to image the measurement target object. Such sensing and imaging technologies are important foundation technologies of the fourth industrial revolution. A TOF-based sensor is traditionally used in distance measurement and imaging, and is used in RADAR, LiDAR (Light Detection and Ranging), ultrasonic detection, and the like.

The TOF of optical pulses is detected by using a synchronized microwave signal. Referring to FIG. 1, the microwave signal is synchronized by reference pulses of a laser. Interrogating pulses reflecting the TOF occur phase (timing) error (difference) with the synchronized microwave signal. The phase error of optical pulses compared to the microwave signal is measured using a phase detector. In this case, since the microwave signal is generated from a voltage controlled oscillator (VCO), which is an external independent signal source, another phase detector for synchronizing the microwave signal to the reference pulses of the laser should be needed.

The above information disclosed in this Background section is only for enhancement of understanding of the background of the invention and therefore it may contain information that does not form the prior art that is already known in this country to a person of ordinary skill in the art.

SUMMARY

The present disclosure may provide an optical phase detector that uses electrical pulses, photo-electrically converted from optical pulses, as a reference signal. The present disclosure may provide a sensing system including the optical phase detector.

Some embodiments of the present disclosure provide a sensing system. The sensing system may include an electrical pulse generator that receives first optical pulses output from a pulsed laser, through a first path, and photo-electrically converts the first optical pulses to generate electrical pulses; and an optical phase detector that receives second optical pulses output from the pulsed laser, through a second path, and outputs an electrical signal that corresponds to a phase error between the electrical pulses and the second optical pulses based on electro-optic sampling.

Optical pulses output from the pulsed laser may be divided into the first optical pulses and the second optical pulses and respectively transmitted to the first path and the second path. The second optic pulses may experience time-of-flight change that relates to the phase error while passing through the second path.

The electrical pulse generator may include at least one photoelectric conversion device.

The at least one photoelectric conversion device may be selected from various types of photodiodes including a PIN photodiode, a uni-travelling-carrier (UTC) photodiode, and a modified-uni-traveling-carrier (MUTC) photodiode.

The optical phase detector may detect the electrical signal that corresponds to the phase error of the second optical pulses by using a rising edge or a falling edge of the electrical pulses.

The optical phase detector may be implemented by using a fiber loop-based optical-microwave phase detector (FLOM-PD), a 3×3 coupler-based phase detector, a balanced optical-microwave phase detector (BOM-PD), or a biased Mach-Zehnder interferometer-based phase detector.

Some embodiments of the present disclosure provide a sensing system. The sensing system may include a sinusoidal waveform generator that receives first optical pulses output from a pulsed laser, through a first path and photo-electrically converting the first optical pulses to generate electrical pulses, and outputs a microwave signal of a specific frequency extracted from the electrical pulses; and an optical phase detector that receives second optical pulses output from the pulsed laser, through a second path, and outputs an electrical signal that corresponds to a phase error between the microwave and the second optical pulses based on electro-optic sampling.

The sinusoidal waveform generator may include at least one photoelectric conversion device that photo-electrically converts the first optical pulses into the electrical pulses; and a band pass filter that extracts the microwave signal from the electrical pulses to output the microwave signal.

The photoelectric conversion device may be selected from various types of photodiodes including a PIN photo diode a uni-travelling-carrier (UTC) photo diode, or a modified-uni-traveling-carrier (MUTC) photodiode.

The specific frequency may be an integer multiple of a repetition rate of the pulsed laser.

The optical phase detector may detect the electrical signal that corresponds to the phase error between zero crossing of the microwave signal and the second optical pulses.

The optical phase detector may be implemented by using a fiber loop-based optical-microwave phase detector (FLOM-PD), a 3×3 coupler-based phase detector, a balanced optical-microwave phase detector (BOM-PD), or a biased Mach-Zehnder interferometer-based phase detector.

Some embodiments of the present disclosure provide a sensing system. The sensing system may include a pulsed laser that outputs optical pulses; a reference signal generator that receives first optical pulses divided from the optical pulses, through a first path, photo-electrically converts the first optical pulses to generate electrical pulses, and outputs a reference signal which is the electrical pulses or a microwave signal of a specific frequency extracted from the electrical pulses; and an optical phase detector that receives second optical pulses divided from the optical pulses, through a second path, and outputs an electrical signal that corresponds to a phase error between the reference signal and the second optical pulses based on electro-optic sampling. The electrical signal may be converted into a measured physical quantity of a sensor that causes a change in time-of-flight of the second optical pulses in the second path.

According to some embodiments, since an optical phase detector uses the electrical pulses that are photo-electrically converted from the optical pulses of the pulsed laser and are synchronized to the pulsed laser, another phase detector for synchronization and a feedback control circuit are unnecessary. Therefore, according to some embodiments, the sensing system requires one optical phase detector and the photoelectric conversion device to detect a phase error (timing error) corresponding to the time-of-flight (TOF) of the optical pulses. Thereby the sensing system has a simple structure and the cost of the sensing system becomes lowered.

According to some embodiments, a phase error can be measured by using a rising edge or a falling edge of electrical pulses or a sinusoidal waveform (sine wave) extracted from the electrical pulses. Particularly, high resolution measurement is available at a linear rising edge of the electrical pulses.

According to some embodiments, even inexpensive photodiodes can increase phase noise performance and provide excellent timing performance than using an external independent signal source.

DETAILED DESCRIPTION OF THE EMBODIMENTS

Figure 1:
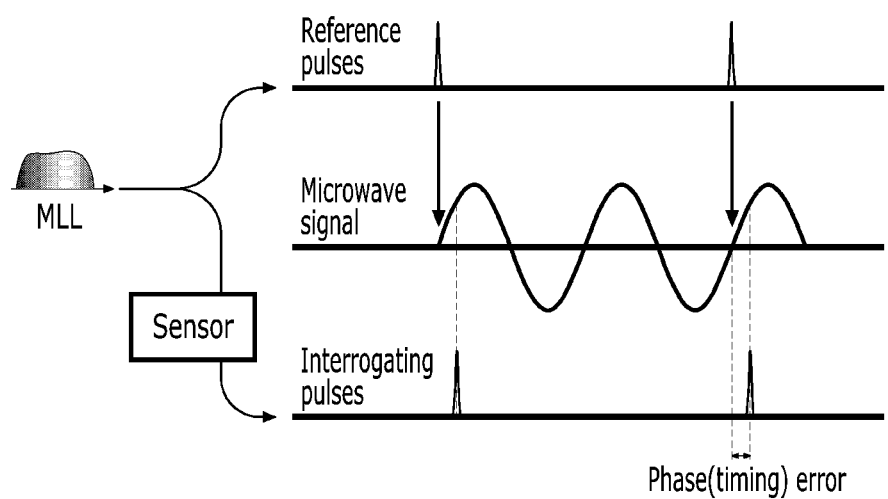
FIG. 1 shows a method for detecting time-of-flight of optical pulses.

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

In addition, unless explicitly described to the contrary, the word "comprise" and variations such as "comprises" or "comprising" will be understood to imply the inclusion of stated elements but not the exclusion of any other elements.

In the entire specification, phase error, timing error, and time-of-flight may be used interchangeably. A sensor may include a sensor head, a device connected to a measurement target object, or a device including a measurement target object. The present disclosure also includes methods provided by sensing systems according to some embodiments, but the methods are not shown in Figures.

Figure 2:
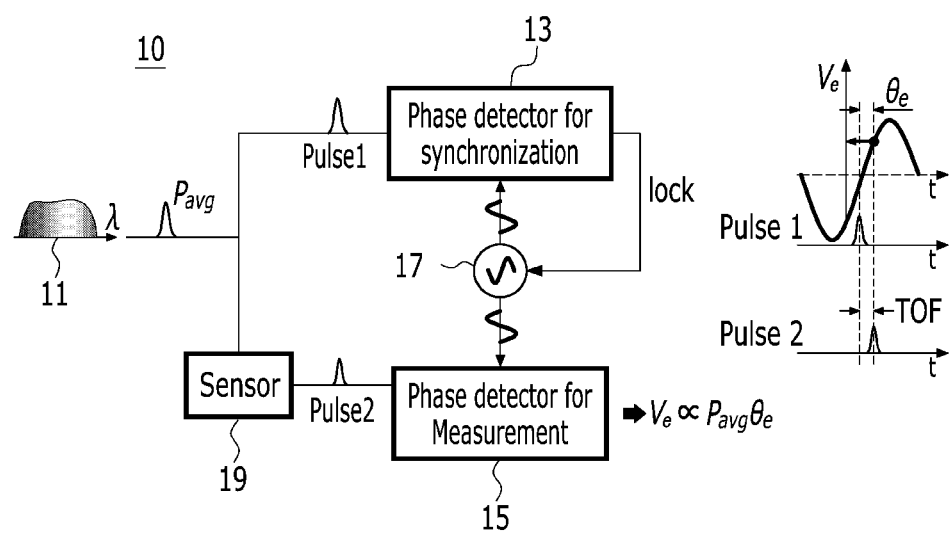
FIG. 2 is a diagram of a sensing system using an independent signal source.

FIG. 2 is a configuration diagram of a sensing system using an independent signal source.

Referring to FIG. 2, a sensing system 10 includes a pulsed laser 11, an optical phase detector for synchronization (hereinafter referred to as a synchronization phase detector) 13, an optical phase detector for measurement (hereinafter referred to as a measurement phase detector) 15, and an RF signal source 17. A sensor 19 is located on an optical path between the pulsed laser 11 and the measurement phase detector 15. The RF signal source 17 is an independent signal source, and may be a voltage controlled oscillator (VCO) to generate a microwave signal. The RF signal source 17 outputs a sinusoidal waveform signal (referred to as a sine wave) having a frequency of an integer multiple of a repetition rate $f_{rep}$ of the pulsed laser 11.

Optical pulses output from the pulsed laser 11, which are called as pulse train, are divided into optical pulses for synchronization (referred to as Pulse 1 or synchronization optical pulses) and optical pulses for measurement (referred to as Pulse 2 or measurement optical pulses). The synchronization optical pulses and the measurement optical pulses are respectively transmitted to the synchronization phase detector 13 and the measurement phase detector 15.

The synchronization phase detector 13 receives the synchronization optical pulses (Pulse 1) and the microwave signal of the VCO 17. The synchronization phase detector 13 calculates a phase (timing) error between the microwave signal from the VCO 17 and the synchronization optical pulses (Pulse 1). The synchronization phase detector 13 sends a feedback signal to the VCO 17. The feedback signal includes information on compensating the phase error between the received signals. Thus, the VCO 17 outputs a synchronized reference signal to the pulsed laser 11. That is, the microwave signal of the VCO 17 becomes phase-locked by the synchronization optical pulses (Pulse 1).

The measurement phase detector 15 receives the microwave signal of the VCO 17, and the measurement optical pulses (Pulse 2) which have been passed through the sensor 19. In this case, the VCO 17 generates the reference signal phase-locked (synchronized) to the pulsed laser 11. The measurement phase detector 15 detects phase error $\theta_e$ between the reference signal from the VCO 17 and the measurement optical pulses. The measurement phase detector 15 outputs an electrical signal (voltage signal) Ve that is proportional to the phase error $\theta_e$ by using electro-optic sampling.

As described, if the microwave signal generated from the VCO 17, which is an independent external signal source, is used as the reference signal of the measurement phase detector 15, the synchronization phase detector 13 is additionally required for synchronizing the VCO 17 to the pulsed laser 11 in a sensing system.

Next, a sensing system capable of high resolution measurement without a synchronization phase detector will be described.

Figure 3:
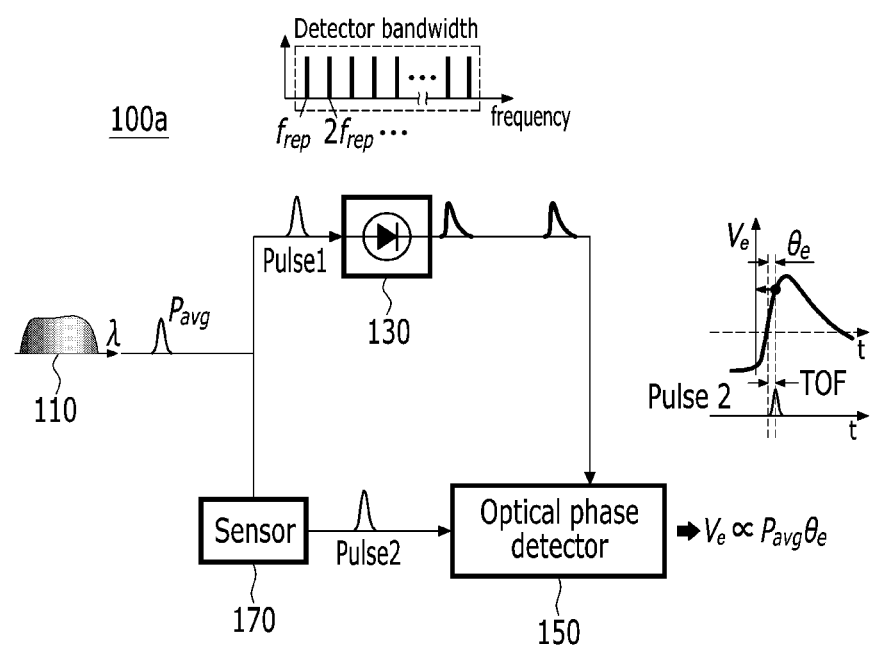
FIG. 3 and FIG. 4 are respectively schematic structure diagrams of a sensing system using electrical pulses according to an exemplary embodiment.
Figure 4:
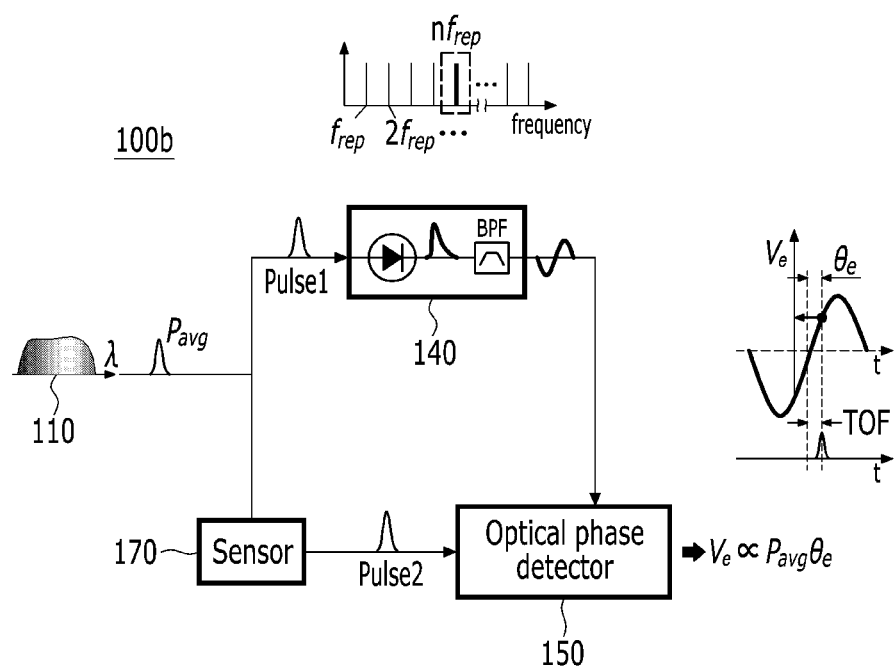

FIG. 3 and FIG. 4 are respectively schematic structure diagrams of a sensing system using electrical pulses according to an exemplary embodiment.

Referring to FIG. 3, a sensing system 100a includes a pulsed laser 110, an electrical pulse generator 130, and an optical phase detector 150. A sensor 170 is located on an optical path between the pulsed laser 110 and the optical phase detector 150. The sensor 170 may be various TOF-based sensors, and for example, may be a strain sensor head that measures strain of an optical fiber or a sensor head that measures steps. The sensing system 100 may further include a computing device operated by a processor (not shown) that calculate a measured physical quantity of the sensor 170 from an electrical signal acquired from the optical phase detector 150.

The pulsed laser 110 periodically outputs optical pulses. The pulsed laser 110 may be a mode-locked laser (MLL). The pulsed laser 110 may be a femtosecond laser which generates very short optical pulses of a femtosecond scale, but the type of laser is not limited and may be changed to other type of laser. The repetition rate $f_{rep}$ of the pulsed laser 110 is a reciprocal number of a time interval (cycle) $T_{rep}$ between pulses.

Optical pulses output from the pulsed laser 110 may be divided into first optical pulses (Pulse 1) and second optical pulses (Pulse 2) by a coupler (not shown). The first optical pulses may be transmitted to the optical path connected to the electrical pulse generator 130 and the second optical pulses may be transmitted to another optical path connected to the optical phase detector 150.

The electrical pulse generator 130 receives the first optical pulses (Pulse 1) transmitted from the pulsed laser 110. The electrical pulse generator 130 photo-electrically converts the first optical pulses to electrical pulses corresponding to photocurrent pulses, and outputs the electrical pulses. The electrical pulse generator 130 may include a photoelectric conversion device that converts/transforms an optical pulse to an electrical pulse. The photoelectric conversion device may be various, and for example, a PIN photodiode, a uni-travelling-carrier (UTC) photodiode, a modified-uni-traveling-carrier (MUTC) photodiode and the like may be used.

The optical phase detector 150 receives the second optical pulses passed through the sensor 170 and the electrical pulses output from the electrical pulse generator 130. The optical phase detector 150 outputs an electrical signal Ve that is proportional to a phase error $\theta_e$ between the electrical pulses and the second optical pulses by using electro-optic sampling. The second optical pulses have the phase (timing) error with respect to the electrical pulses.

The optical phase detector 150 may detect the phase error of the optical pulse by using a specific position of a rising edge or a falling edge in the electrical pluses. For example, the optical phase detector 150 may detect a phase error with respect to a specific position of the rising edge. In this case, an arbitrarily selected position in the rising edge may be used as the specific position. In particular, since a phase (timing) range that can be linearly used is widest in bi-directions at a midpoint of the rising edge, the midpoint of the rising edge may be used as the specific position for error detection.

In particular, since a timing difference (jitter) between the rising edge of the electrical pulse and the optical pulse is very small, at less than 1 femtosecond, the optical phase detector 150 may provide high resolution measurements on the rising edge.

The optical phase detector 150 may be implemented by various techniques for outputting an electrical signal Ve that is proportional to the phase error of the optical pluses with respect to the electrical pulses. For example, the optical phase detector 150 may be implemented by various methods such a fiber loop-based optical-microwave phase detector (FLOM-PD) using a Sagnac loop interference system, a 3×3 coupler-based phase detector, a balanced optical-microwave phase detector (BOM-PD), a biased Mach-Zehnder interferometer-based phase detector and the like.

Referring to FIG. 4, a sensing system 100b may use a sinusoidal microwave signal extracted from electrical pulses as a reference signal. For this, the sensing system 100b includes a sinusoidal waveform generator 140 that includes a photoelectric conversion device that photo-electrically converts an optical pulse to output an electrical pulse, and a bandpass filter (BPF). The sinusoidal waveform generator 140 may further include the bandpass filter in the electrical pulse generator 130 of FIG. 3.

When the electrical pulses generated from the photoelectric conversion device (e.g., a photodiode) passes through the bandpass filter, the microwave signal having one frequency mode $nf_{rep}$ filtered among frequency bandwidth of the electrical pulse is generated as the reference signal.

The optical phase detector 150 outputs an electrical signal Ve that is proportional to the phase error $\theta_e$ between the microwave signal extracted from the electrical pulse and second optical pulses by using electro-optic sampling. The optical phase detector 150 may detect the phase error with respect to zero crossing of the microwave signal.

As previously described with reference to FIG. 3 and FIG. 4, the electrical pulses are generated by photoelectric converting from the optical pulses of the pulsed laser 110. Therefore the electrical pulses have been already frequency-synchronized with the repetition rate $f_{rep}$ of the pulsed laser 110. Since the optical phase detector 150 detects an error of the optical pulses with respect to the electrical pulses (or the microwave signal extracted from the electrical pulses) which is inherently synchronized to the pulsed laser 110, the sensing system 100a and the sensing system 100b do not need an optical phase detector for synchronization.

Figure 5:
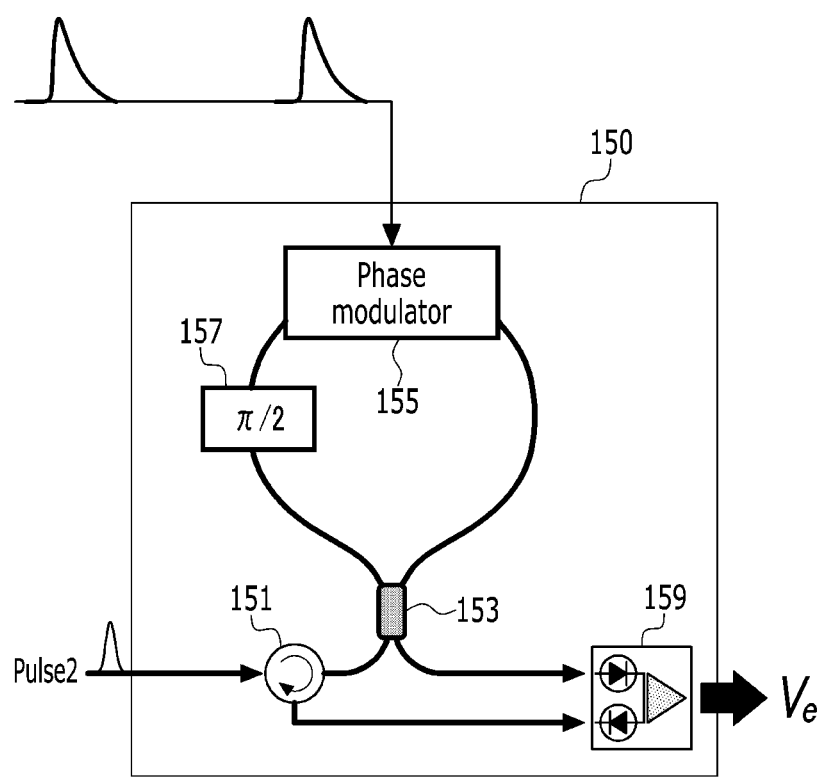
FIG. 5 exemplarily illustrates an optical phase detector according to an exemplary embodiment.

FIG. 5 exemplarily illustrates an optical phase detector according to an exemplary embodiment.

Referring to FIG. 5, an optical phase detector 150 may be implemented as a fiber loop-based optical-microwave phase detector (FLOM-PD).

The optical phase detector 150 implemented as the FLOM-PD may include a circulator 151, a coupler 153 implemented in a loop, a phase modulator 155, and a quadrature bias unit (π/2) 157. The optical phase detector 150 includes a balanced photodetector 159 that outputs an electrical signal corresponding to an intensity difference of optical signals entered.

The second optical pulses (Pulse 2) passed through the sensor 170 pass through the circulator 151 and reach the coupler 153. The coupler 153 generates two optical pulses by dividing optical power in half, and transmits the divided optical pulses in different directions of the loop.

The phase modulator 155 receives electrical pulses output from the pulse generator 130 as a reference signal, and modulates a phase of first directional pulses by using the reference signal. The first directional pulses and second direction pulses may have a phase difference of π/2 while passing through the quadrature bias 157. Meanwhile, the phase modulator 155 may receive the microwave signal as the reference signal, from the sinusoidal waveform generator 140 of FIG. 4, and do the phase modulation by using the microwave signal.

The first and second directional pulses where a phase difference occurs while circulating the loop in different directions are combined at the coupler 153, where interference occurs. The coupler 153 divides the combined optical signal, and two optical signals divided are input to the balanced photodetector 159. A phase difference of the optical pulses and the reference signal may be transferred into an intensity difference between two optical signals due to the interference.

The balanced photodetector 159 may include two photodiodes and a differential amplifier. The balanced photodetector 159 outputs an electrical signal Ve which is corresponding to an intensity difference of optical signals which are entered into the two photodiodes respectively. The electrical signal Ve is proportional to a phase error between the electrical pulses and the second optical pulses, and corresponds to a measured physical quantity related to the sensor.

Figure 6:
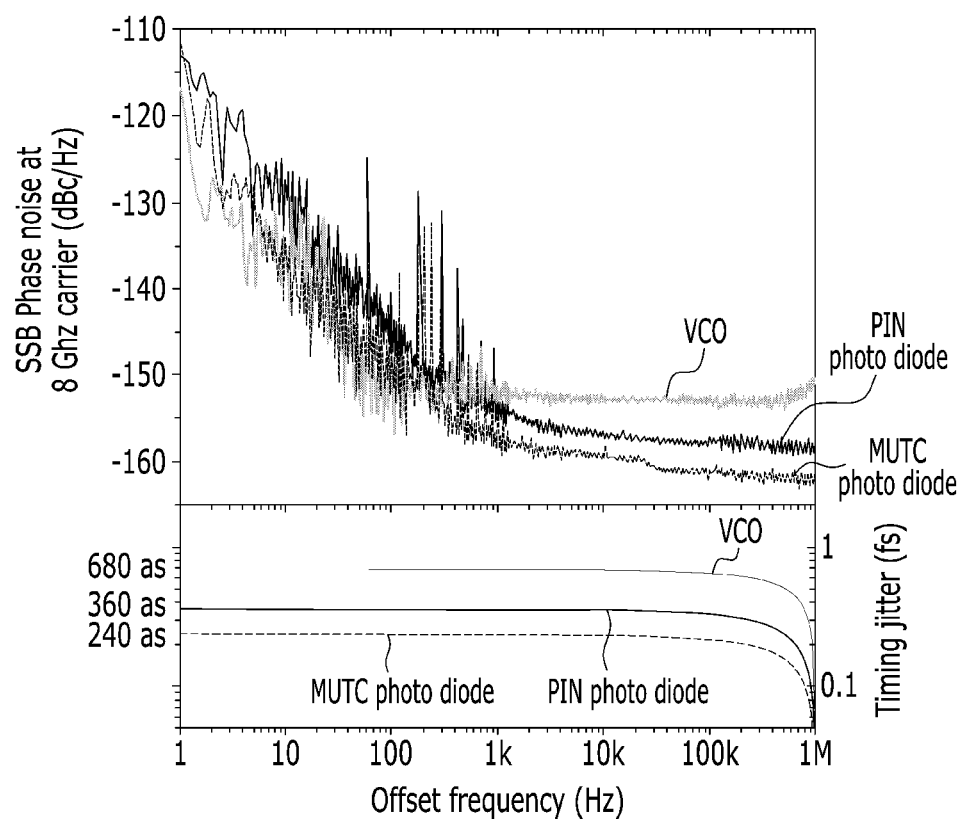
FIG. 6 and FIG. 7 are graphs respectively illustrating performance of a sensing system using electrical pulses according to an exemplary embodiment.
Figure 7:
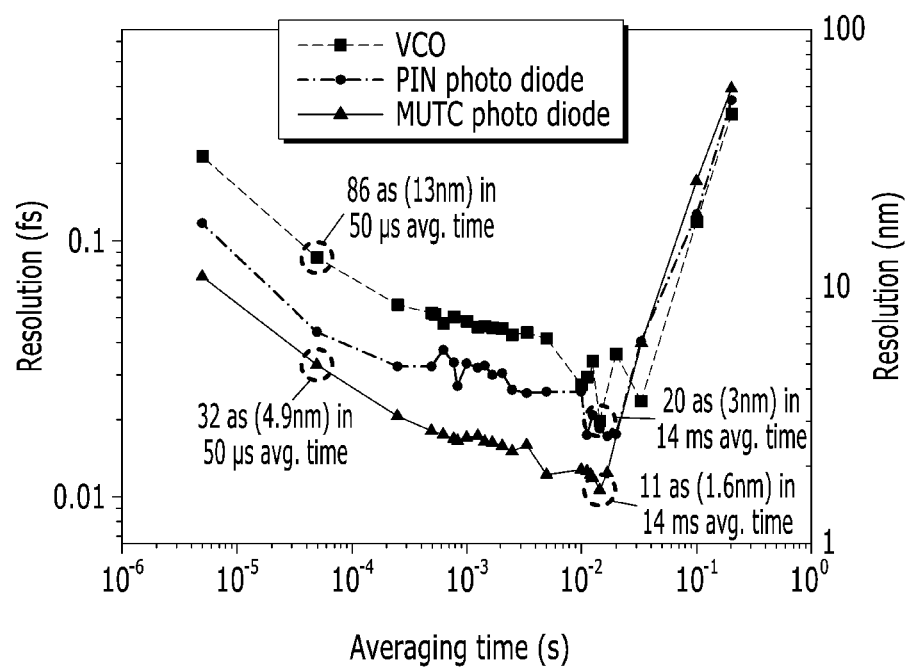

FIG. 6 and FIG. 7 are graphs respectively illustrating performance of a sensing system using electrical pulses according to an exemplary embodiment.

FIG. 6 shows a measurement result of a signal sideband (SSB) phase noise and timing jitter of the optical pulses, which are measured by using a microwave signal from a VCO, electrical pulses from a PIN photodiode, and electrical pulses from an MUTC photodiode, respectively.

It shows that the electrical pulses photo-electrically converted from the optical pulses provide excellent phase noise performance, compared to the VCO. In addition, the timing jitter at a rising edge of the electrical pulse is less than 1 femtosecond not only in UTC photodiode having high linearity but also in low-cost PIN photo diode. Thus, an optical phase detector that uses electrical pulses with timing jitter of less than 1 femtosecond can make high resolution measurements.

FIG. 7 shows a comparison result of resolution of optical phase detectors respectively using the microwave signal from the VCO, the electrical pulses from the PIN photodiode, and the electrical pulses from the MUTC photodiode as a reference signal.

It shows that resolution of optical phase detector using the electrical pulses is improved than using the microwave signal from the VCO. In particular, although the low-cost PIN photodiode is used, more improved resolution than that of the VCO can be provided.

Since electrical pulses inherently synchronized with the pulsed laser is generated from the electrical pulse generator 130 and the electrical pulses or the microwave signal extracted from the electrical pulses is used as a reference signal of the optical phase detector 150, and thus a synchronization device is unnecessary and phase noise performance and timing performance can be improved.

According to some embodiments, since an optical phase detector uses the electrical pulses that are photo-electrically converted from the optical pulses of the pulsed laser and are synchronized to the pulsed laser, another phase detector for synchronization and a feedback control circuit are unnecessary. Therefore, according to some embodiments, the sensing system requires one optical phase detector and the photoelectric conversion device to detect a phase error (timing error) corresponding to the time-of-flight (TOF) of the optical pulses. Thereby the sensing system has a simple structure and the cost of the sensing system becomes lowered.

According to some embodiments, a phase error can be measured by using a rising edge or a falling edge of electrical pulses or a sinusoidal waveform (sine wave) extracted from the electrical pulses. Particularly, high resolution measurement is available at a linear rising edge of the electrical pulses.

According to some embodiments, even inexpensive photodiodes can increase phase noise performance and provide excellent timing performance than using an external independent signal source.

The embodiments of the present disclosure described above are not implemented only by the device and method, and may be implemented using a program for realizing a function corresponding to the configuration of the embodiment of the present disclosure or a recording medium storing the program.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A sensing system comprising:
an electrical pulse generator that receives first optical pulses output from a pulsed laser, through a first path, and photo-electrically converts the first optical pulses to generate electrical pulses; and
an optical phase detector that receives second optical pulses output from the pulsed laser, through a second path, and outputs an electrical signal that corresponds to a phase error between the electrical pulses and the second optical pulses based on electro-optic sampling.

2. The sensing system of claim 1, wherein
optical pulses output from the pulsed laser are divided into the first optical pulses and the second optical pulses and respectively transmitted to the first path and the second path, and
the second optical pulses experience time-of-flight change that relates to the phase error while passing through the second path.

3. The sensing system of claim 1, wherein the electrical pulse generator comprises at least one photoelectric device.

4. The sensing system of claim 3, wherein the at least one photoelectric conversion device is selected from various types of photodiodes including a PIN photodiode, a uni-travelling-carrier (UTC) photodiode, and a modified-uni-traveling-carrier (MUTC) photodiode.

5. The sensing system of claim 1, wherein the optical phase detector detects the electrical signal that corresponds to the phase error of the second optical pulses by using a rising edge or a falling edge of the electrical pulses.

6. The sensing system of claim 1, wherein the optical phase detector is implemented by using a fiber loop-based optical-microwave phase detector (FLOM-PD), a 3×3 coupler-based phase detector, a balanced optical-microwave phase detector (BOM-PD), or a biased Mach-Zehnder interferometer-based phase detector.

7. A sensing system comprising:
a sinusoidal waveform generator that receives first optical pulses output from a pulsed laser, through a first path and photo-electrically converting the first optical pulses to generate electrical pulses, and outputs a microwave signal of a specific frequency extracted from the electrical pulses; and
an optical phase detector that receives second optical pulses output from the pulsed laser, through a second path, and outputs an electrical signal that corresponds to a phase error between the microwave and the second optical pulses based on electro-optic sampling.

8. The sensing system of claim 7, wherein the sinusoidal waveform generator comprises:
at least one photoelectric conversion device that photo-electrically converts the first optical pulses into the electrical pulses; and
a band pass filter that extracts the microwave signal from the electrical pulses to output the microwave signal.

9. The sensing system of claim 8, wherein the photoelectric conversion device is selected from various types of photodiodes including a PIN photodiode, a uni-travelling-carrier (UTC) photodiode, and a modified-uni-traveling-carrier (MUTC) photodiode.

10. The sensing system of claim 8, wherein the specific frequency is an integer multiple of a repetition rate of the pulsed laser.

11. The sensing system of claim 7, wherein the optical phase detector detects the electrical signal that corresponds to the phase error between zero crossing of the microwave signal and the second optical pulses.

12. The sensing system of claim 7, wherein the optical phase detector is implemented by using a fiber loop-based optical-microwave phase detector (FLOM-PD), a 3×3 coupler-based phase detector, a balanced optical-microwave phase detector (BOM-PD), or a biased Mach-Zehnder interferometer-based phase detector.

13. A sensing system comprising:
a pulsed laser that outputs optical pulses;
a reference signal generator that receives first optical pulses divided from the optical pulses, through a first path, photo-electrically converts the first optical pulses to generate electrical pulses, and outputs a reference signal which is the electrical pulses or a microwave signal of a specific frequency extracted from the electrical pulses; and
an optical phase detector that receives second optical pulses divided from the optical pulses, through a second path, and outputs an electrical signal that corresponds to a phase error between the reference signal and the second optical pulses based on electro-optic sampling,
wherein the electrical signal is converted into a measured physical quantity of a sensor that causes a change in time-of-flight of the second optical pulses in the second path.

* * * * *